(12) United States Patent
Saimi et al.

(10) Patent No.: US 7,126,905 B2
(45) Date of Patent: Oct. 24, 2006

(54) INFORMATION RECORDING MEDIUM AND INFORMATION RECORDING/REPRODUCING APPARATUS TO INCREASE RECORDING DENSITY

(75) Inventors: Tetsuo Saimi, Osaka (JP); Akihiro Arai, Kyoto (JP); Tohru Nakamura, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 493 days.

(21) Appl. No.: 10/362,039

(22) PCT Filed: Sep. 28, 2001

(86) PCT No.: PCT/JP01/08611

§ 371 (c)(1),
(2), (4) Date: May 5, 2003

(87) PCT Pub. No.: WO02/27716

PCT Pub. Date: Apr. 4, 2002

(65) Prior Publication Data

US 2003/0169671 A1    Sep. 11, 2003

(30) Foreign Application Priority Data

Sep. 29, 2000 (JP) .............................. 2000-300052
Dec. 4, 2000 (JP) .............................. 2000-368043

(51) Int. Cl.
*G11B 7/00* (2006.01)

(52) U.S. Cl. .............................. 369/112.26; 369/13.33; 369/112.25; 369/44.12; 369/47.27

(58) Field of Classification Search ........... 369/112.26, 369/13.33, 112.25, 44.12, 47.27
See application file for complete search history.

(56) References Cited

U.S. PATENT DOCUMENTS

| | | | | |
|---|---|---|---|---|
| 4,314,262 A | * | 2/1982 | Reilly | 346/135.1 |
| 5,332,618 A | * | 7/1994 | Austin | 428/216 |
| 6,128,274 A | * | 10/2000 | Mori et al. | 369/275.5 |
| 6,552,968 B1 | * | 4/2003 | Kishima et al. | 369/13.38 |

FOREIGN PATENT DOCUMENTS

| | | |
|---|---|---|
| JP | 57-050337 | 3/1982 |
| JP | 61-265749 | 11/1986 |
| JP | 02-158932 | 6/1990 |
| JP | 03-132942 | 6/1991 |
| JP | 03-178049 | 8/1991 |
| JP | 03-250438 | 11/1991 |
| JP | 07-014209 | 1/1995 |
| JP | 08-221828 | 8/1996 |
| JP | 10-003484 | 1/1998 |
| JP | 2001-023244 | 1/2001 |

OTHER PUBLICATIONS

Grann et al.; "Optimal design for antireflective tapered two-dimensional subwavelength grating structures;" J. Opt. Soc. Am A; vol. 12, No. 2, Feb. 1995; pp. 333-339.

* cited by examiner

*Primary Examiner*—Wayne Young
*Assistant Examiner*—Minerva Rivero
(74) *Attorney, Agent, or Firm*—Renner, Otto, Boisselle & Sklar, LLP (57) ABSTRACT

An information recording medium 101 includes: a transparent substrate 109 having a first surface A and a second surface B opposite to the first surface A; reflectance reduction means 110 provided on the first surface A of the transparent substrate 109; and an information recording layer 120 provided on the second surface B of the transparent substrate 109.

9 Claims, 6 Drawing Sheets

INFORMATION RECORDING MEDIUM AND INFORMATION RECORDING/REPRODUCING APPARATUS TO INCREASE RECORDING DENSITY

TECHNICAL FIELD

The present invention relates to an information recording medium and an information recording/reproducing apparatus.

BACKGROUND ART

Examples of conventionally known optical discs to/from which information is recorded/reproduced include CDs, DVDs, etc. When recording/reproducing information to/from a conventional optical disc, an incident angle of light incident on a surface of the optical disc does not have a great value.

Figure 7:
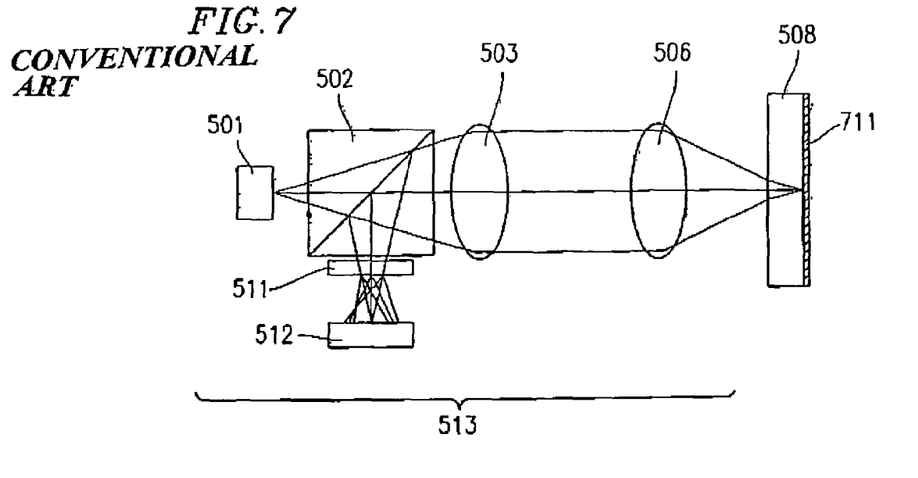
FIG. 7 is a diagram illustrating an exemplary configuration including a conventional optical disc 508 and an optical head 513 for recording/reproducing information to/from an optical disc 508.

FIG. 7 illustrates an exemplary configuration including a conventional optical disc 508 and an optical head 513 for recording/reproducing information to/from the optical disc 508. The optical head 513 includes a radiation source 501, a beam splitter 502, a collimating lens 503, an objective lens 506, a hologram 511, and a photodetector 512.

When reproducing information recorded on the optical disc 508, a light beam emitted by the radiation source 501 is transmitted through the beam splitter 502 and rendered into a parallel beam by the collimating lens 503. The parallel beam enters the objective lens 506 and is converged on an information recording layer 711 of the optical disc 508.

Generally, a semiconductor laser is used as the radiation source 501. An emission wavelength of the semiconductor laser is in the range of about 780 nm to about 810 nm when the optical disc 508 is a CD and in the range of about 630 nm to about 670 nm when the optical disc 508 is a DVD.

The light beam is reflected by the information recording layer 711 and transmitted, again, through the objective lens 506 and the collimating lens 503. Then, the light beam is reflected by the beam splitter 502 to enter the photodetector 512. In the photodetector 512, an information signal representing information recorded on the optical disc 508 and a servo signal for tracking are retrieved from the light beam.

Figure 8:
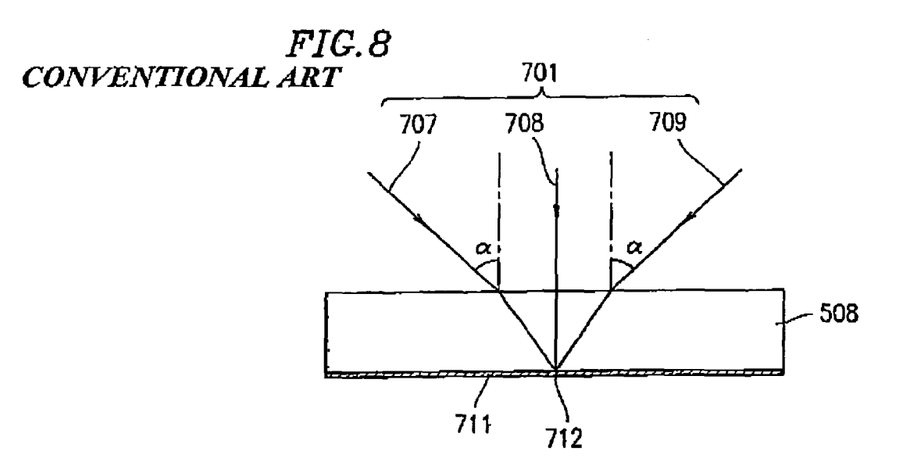
FIG. 8 is a diagram illustrating a light beam 701 incident on the optical disc 508.

FIG. 8 illustrates a light beam 701 incident on the optical disc 508. The light beam 701 includes light 708 vertically incident (i.e., an incident angle is 0°) on a surface of the optical disc 508 and lights 707 and 709 incident on the optical disc 508 at an incident angle α. The light beam 701 is converged on the information recording layer 711 to form a light spot 712.

In recent years, for the purpose of recording multimedia data including large-sized dynamic image data or the like, there has been a demand to increase the density of information to be recorded to the optical disc 508. One method for increasing the density of information to be recorded to the optical disc 508 is to reduce the size of the light spot 712 to be formed on the information recording layer 711.

The diameter ϕ of the light spot 712 is represented by the following expression (1):

$$\phi = k \cdot \lambda / (NA) \quad (1),$$

where is λ wavelength of the light beam 701 (i.e., wavelengths of lights 707, 708, and 709), k is a constant, and NA is a numerical aperture of the objective lens 506 (FIG. 7). Constant k is determined according to light distribution at an entrance pupil. Constant k is small when the light distribution at the entrance pupil is uniform, and constant k is large when the light distribution at the entrance pupil is not uniform (e.g., light around the periphery of the entrance pupil is weaker than that in a central portion of the entrance pupil).

As can be appreciated from expression (1), in order to reduce the size of the light spot 712, it is necessary to: (1) increase the numerical aperture NA of the objective lens; (2) uniformly distribute light over the entrance pupil to reduce constant k; or (3) reduce wavelength λ of the light beam.

The wavelength λ of the light beam 701 is determined based on an emission wavelength of the radiation source (e.g., a semiconductor laser) 501 (shown in FIG. 7). In recent years, a semiconductor laser having a short emission wavelength, such as a blue semiconductor laser, is used to reduce the size of a light spot based on the above-mentioned method (3). However, in the case of a conventional optical disc, when the numerical aperture NA of the objective lens is increased, the maximum possible incident angle of light incident on a surface of the optical disc becomes large, and thus a reflectance for the light becomes large, so that light distribution at the entrance pupil cannot be uniform.

Figure 9:
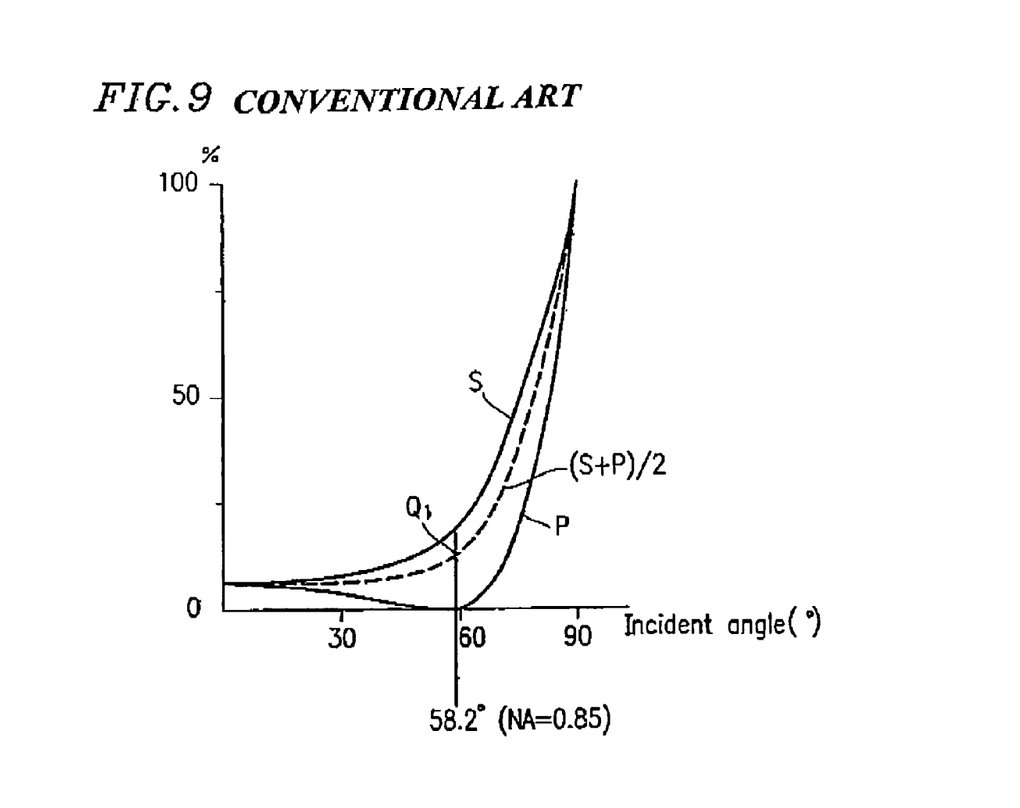
FIG. 9 is a diagram showing a relationship between an incident angle of light incident on the conventional optical disc 508 (FIG. 8) and a reflectance for the light reflected from a surface of the optical disc.

FIG. 9 shows a relationship between an incident angle of light incident on the conventional optical disc 508 (FIG. 8) and a reflectance for the light reflected from a surface of the optical disc. In FIG. 9, dependence of a reflectance on an incident angle is shown with respect to each of S-polarized light (indicated by S in the figure) and P-polarized light (indicated by P in the figure). Note that the P-polarized light refers to polarized light having an electric vector parallel to a cross section of incidence (i.e., a plane including a normal line of a plane on which light is incident and the incident light), and the S-polarized light refers to polarized light having an electric vector perpendicular to the cross section of incidence.

From FIG. 9, even when the S- and P-polarized lights have the same incident angle, respective reflectances for the S- and P-polarized lights are different from each other. Light incident on the objective lens 506 (FIG. 7) is generally circularly polarized light, and thus an average reflectance for the light beam 701 shown in FIG. 8 from the surface of the optical disc 508 corresponds to an intermediate value (shown as (S+P)/2 in the figure) between the reflectances for the S- and P-polarized lights. Hereinafter, a reflectance for light refers to the intermediate value ((S+P)/2) between the reflectances for the S- and P-polarized lights unless otherwise indicated.

FIG. 9 shows that reflectances for the P- and S-polarized lights are approximately 0% and 20%, respectively, when the incident angle is in the vicinity of 58°. Note that the maximum possible incident angle and the numerical aperture NA of the objective lens 506 are related to each other such that the maximum possible incident angle is increased along with an increase of the numerical aperture NA of the objective lens 506. The maximum possible incident angle α=58.2° corresponds to the numerical aperture NA=0.85 of the objective lens 506.

It is appreciated that in the case of the conventional optical disc 508, when the numerical aperture NA of the objective lens 506 (FIG. 7) is increased (e.g., when the numerical aperture NA is increased to such an extent that the incident angle is greater than 45°), the average reflectance indicated as (S+P)/2 in the figure is abruptly increased. A large reflectance means that light transmitted through the optical disc 508 and reaching the light spot 712 is weak. Accordingly, in the case of the conventional optical disc 508, when the numerical aperture NA of the objective lens 506

(FIG. 7) is increased, light around the periphery of the entrance pupil (e.g., light having entered the optical disc 508 at the maximum possible incident angle α and reached the light spot 712) becomes weak. Weakening of light around the periphery of the entrance pupil is equivalent to a relative increase of a value of constant k in the above expression (1). Accordingly, an effect of reducing the size of the light spot 712 cannot be achieved, regardless of the increased numerical aperture NA.

As described above, with a conventional optical disc, the light spot cannot be sufficiently small, and thus it is not possible to increase a recording density of information.

The present invention has been made in view of the above problem and an objective thereof is to provide an information recording medium capable of increasing the recording density of information. Another objective of the present invention is to provide an information recording/reproducing apparatus using the same information recording medium.

DISCLOSURE OF THE INVENTION

An information recording medium of the present invention comprises: a transparent substrate having a first surface and a second surface opposite to the first surface; reflectance reduction means provided on the first surface of the transparent substrate; and an information recording layer provided on the second surface of the transparent substrate, wherein portions of light having entered the first surface at an incident angle in the range of 0° to a maximum possible incident angle, which are transmitted through the transparent substrate, are used for recording information to the information recording layer or reproducing information recorded on the information recording layer, and wherein the reflectance reduction means reduces a reflectance for the light which enters the first surface at the maximum possible incident angle and is reflected by the first surface, thereby achieving the above objectives.

The reflectance reduction means may include a transparent thin film layer.

A thickness of the thin film layer may be set so as to minimize a substantial reflectance for light, which enters the first surface of the transparent substrate, while being converged, at an incident angle in the range of 0° to the maximum possible incident angle and is reflected by the first surface of the transparent substrate.

The thickness of the thin film layer may be set such that a reflectance for light, which enters the first surface of the transparent substrate at the maximum possible incident angle and is reflected by the first surface of the transparent substrate, is substantially equal to that for a reflectance for light, which enters the first surface of the transparent substrate at an incident angle of 0° and is reflected by the first surface of the transparent substrate.

The thickness of the thin film layer may be set so as to minimize the reflectance for light, which enters the first surface of the transparent substrate at the maximum possible incident angle and is reflected by the first surface of the transparent substrate.

The light entering at the maximum possible incident angle may have a prescribed wavelength λ and the thickness of the thin film layer may be set so as to substantially satisfy $t=\lambda/(4 \cdot n \cdot \cos \beta)$, where n is an index of refraction of the thin film layer and β is an angle satisfying $\sin \alpha/\sin \beta = n$ when the maximum possible incident angle is α.

A hardness of the thin film layer may be greater than that of the transparent substrate.

The index of refraction of the thin film layer may be smaller than that of the transparent substrate.

The maximum possible incident angle may be 50° or more to 72° or less.

The light entering at the maximum possible incident angle may have a prescribed wavelength λ and the reflectance reduction means may include a plurality of structures arranged on the second surface in a two-dimensional manner, each of the plurality of structures being substantially conical or pyramidal and having a dimension of λ/4 or more to 2λ or less along the first surface and a height of λ/2 or more to 3λ or less from the first surface.

The plurality of structures may be formed by transcription using a forming die.

The plurality of structures may be formed on a film formed of a resin material laminated on the first surface of the transparent substrate.

An information recording/reproducing apparatus of the present invention comprises: the above-described information recording medium; a radiation source for emitting light; and light converging means for allowing the light emitted by the radiation source to enter the first surface of the information recording medium at an incident angle in the range of 0° to a maximum possible incident angle, thereby achieving the above objectives.

The maximum possible incident angle may be 50° or more to 72° or less.

BEST MODE FOR CARRYING OUT THE INVENTION

Hereinafter, examples of the present invention will be described with reference to the drawings. Herein, identical elements are denoted by identical reference numerals, and repeated description of such elements may be omitted.

EXAMPLE 1

Figure 1:
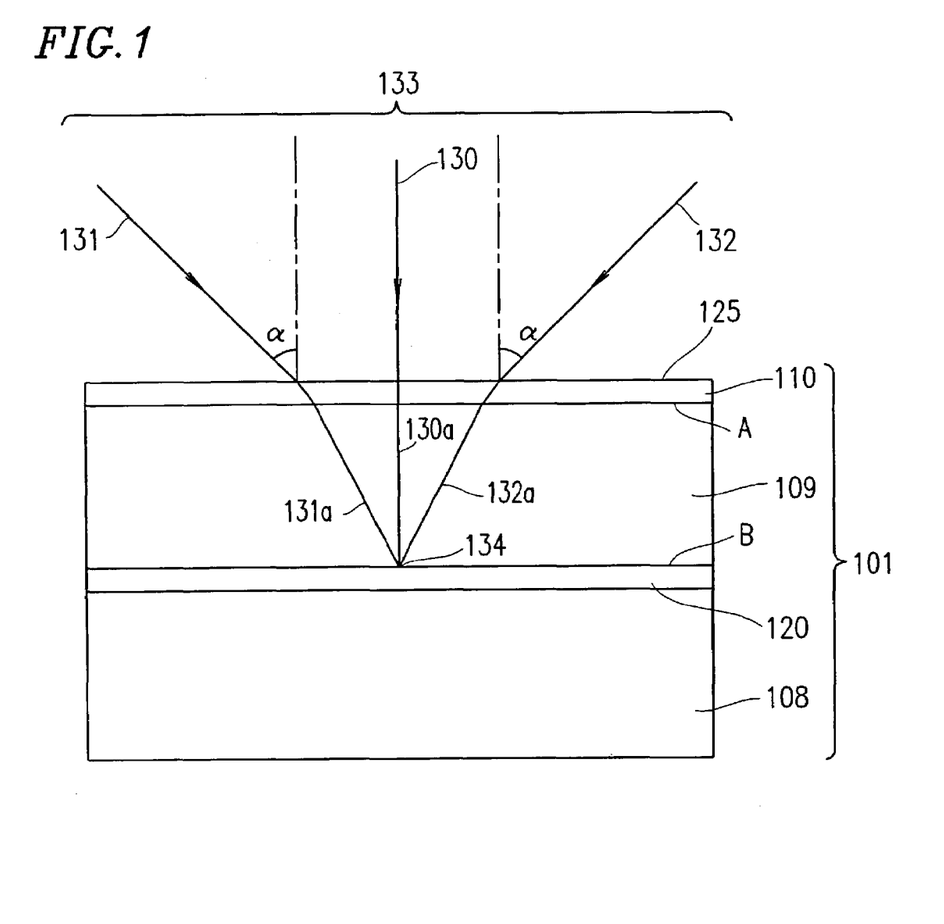
FIG. 1 is a cross-sectional view of an optical disc 101 (an information recording medium) according to Example 1 of the present invention.

FIG. 1 is a cross-sectional view of an optical disc 101 (an information recording medium) according to Example 1 of the present invention. The optical disc 101 includes: a transparent substrate 109 having a surface A (a first surface) and a surface B (a second surface) opposite to the surface A; a thin film layer 110 provided on the surface A of the transparent substrate 109; and an information recording layer 120 provided on the surface B of the transparent substrate 109. All of these elements are held on a base 108.

The information recording layer 120 may have any configuration capable of retaining information.

FIG. 1 shows that light (lights 130, 131, and 132) enters the surface A of the transparent substrate 109 at an angle in the range of 0° to α (the maximum possible incident angle). Portions of the lights 130, 131, and 132 transmitted through the transparent substrate 109 (corresponding to lights 130a, 131a, and 132a) are converged on the information recording layer 120. The transmitted light (the lights 130a, 131a, and 132a) is used for recording/reproducing information to/from the information recording layer 120. Strictly speaking, the light incident on the optical disc 101 (e.g., the light 130, 131, and 132) enters the thin film layer 110 from the surface 125 thereof, and then the light is transmitted through the thin film layer 110 to enter the transparent substrate 109 from the boundary (the surface A) between the thin film layer 110 and the transparent substrate 109. However, the thin film layer 110 is extremely thin (e.g., its thickness is smaller than the wavelength λ of the lights 130, 131, and 132). Accordingly, the surface 125 of the thin film layer 110 and the surface A of the transparent substrate 109 are not distinguished from each other and are considered as being the same single surface when described in conjunction with incidence and reflection of light unless otherwise indicated. Therefore, the expression "a reflectance for light incident on and reflected from the surface A of the transparent substrate 109" is defined as the ratio of power between reflected light and incident light with respect to a single surface.

When recording information to the information recording layer 120, a light beam 133 is modulated according to the information. The state of a portion of the information recording layer 120 where a light spot 134 is formed is changed (e.g., a crystal condition of such a portion is changed) according to the information. As a result, a change in the state of the information recording layer 120 is recorded as information to the information recording layer 120.

When reproducing information recorded on the information recording layer 120, the light beam 133 is reflected by the information recording layer 120 at a reflectance according to the state of the information recording layer 120. An information recording/reproducing apparatus (not shown in FIG. 1, see FIG. 5) detects the intensity of the reflected light to reproduce information.

The optical disc 101 (an information recording medium) may be a reproduction-only recording medium or a recordable and reproducible recording medium.

Note that the maximum possible incident angle α is a constant conforming to a prescribed standard for the optical disc 101. The maximum possible incident angle α may be, for example, 50° or more to 72° or less. The lights 130, 131, and 132 correspond to light emitted from the same radiation source and have a prescribed wavelength λ defined by the standard to which the optical disc 101 conforms. It should be noted that the term "transparent" described herein refers to the possession of a property of transmitting light having the prescribed wavelength λ.

In one embodiment, a polycarbonate resin having a thickness of 0.1 mm was used as the transparent substrate 109, and a polycarbonate resin having a thickness of 1.1 mm was used as the base 108. The transparent thin layer 110 was formed of a single layer of an acrylic resin material. In FIG. 1, the transparent substrate 109 is provided on only one side of the base 108. However, the transparent substrate 109 may be provided on each side of the base 108. When providing the same structure at each side of the base 108, the optical disc 101 has a symmetrical structure with respect to the base 108. Consequently, it is possible to efficiently prevent the optical disc 101 from being tilted. Further, since the information recording layer 120 can be formed on each side of the base 108, recording capacity can be doubled, thereby satisfying the demand for mass storage.

Figure 2:
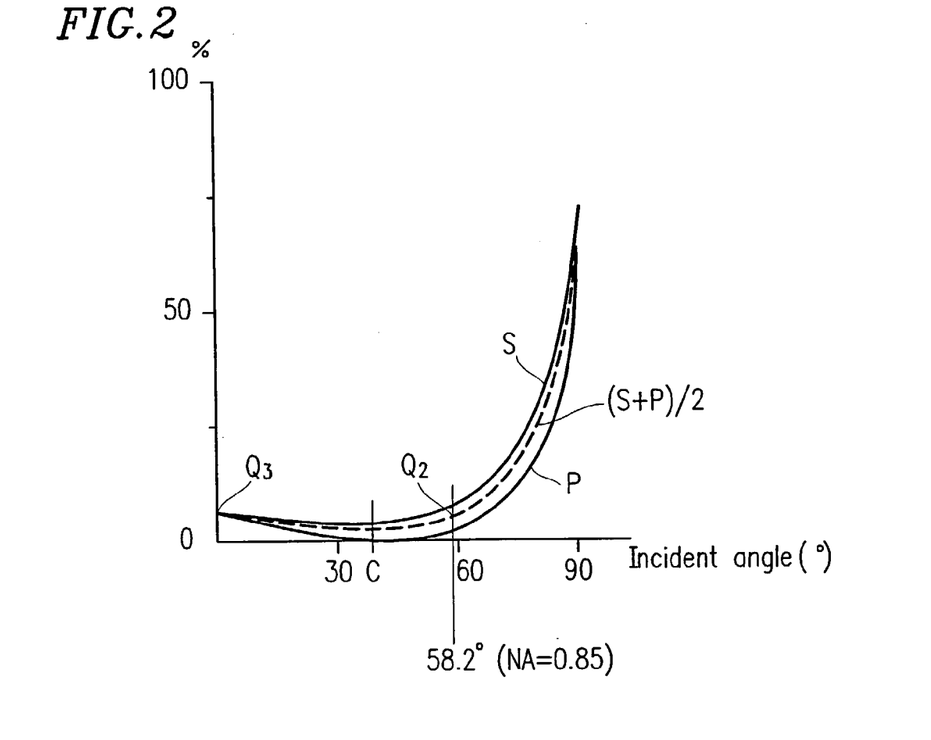
FIG. 2 is a diagram showing a relationship between an incident angle of light incident on the optical disc 101 (FIG. 1) of the present invention and a reflectance for the light reflected from the surface A of a transparent substrate 109.

FIG. 2 shows a relationship between an incident angle of light incident on the optical disc 101 (FIG. 1) of the present invention and a reflectance for the light reflected from the surface A of the transparent substrate 109. As can be appreciated by comparing FIGS. 2 to 9, the optical disc 101 of the present invention can reduce a reflectance for light reflected from the surface A of the transparent substrate 109 with respect to an incident angle in the range of 0° to 72°. The principle that the reflectance for light reflected from the surface A of the transparent substrate 109 is reduced holds because the light reflected by the surface A of the transparent substrate 109 is weakened by interfering with light reflected by the surface of the thin film layer 110.

In FIG. 9, the reflectance for the S-polarized light is increased along with an increase of the incident angle, while, in FIG. 2, the reflectance for the S-polarized light is a minimum when the incident angle has a value indicated by symbol C. The incident angle C corresponds to NA=approximately 0.4 to 0.45.

Similar to the case described above with reference to FIG. 9, an average reflectance for the light beam 133 shown in FIG. 1 from the surface A of the transparent substrate 109 corresponds to an intermediate value (shown as (S+P)/2 in the figure) between reflectances for the S- and P-polarized lights. The dependence of the average reflectance on the incident angle varies according to a thickness of the thin film layer 110 (FIG. 1). The optical disc 101 of the present invention reduces the size of the light spot formed on the information recording layer 120 (FIG. 1), and therefore a reflectance for light, which enters the surface A of the transparent substrate 109 at a maximum possible angle α and is reflected by the surface A, is reduced. Accordingly, the optical disc 101 of the present invention is configured such that the thin film layer 110 has a thickness satisfying at least the following condition 1.

Condition 1: the thickness of the thin film layer 110 is set so as to satisfy the condition that provision of the thin film layer 110 reduces the reflectance for light which enters the surface A of the transparent substrate 109 at the maximum possible angle α and is reflected by the surface A. This means that when the maximum possible incident angle conforming to the standard for the optical disc 101 is, for example, α=58.2° (NA=0.85), a reflectance indicated at point $Q_2$ (FIG. 2) is lower than that indicated at point $Q_1$ (FIG. 9). When this condition is satisfied, provision of the thin film layer 110 intensifies light around the periphery of the entrance pupil. Accordingly, when the thin film layer 110 is provided, light distribution at the entrance pupil becomes uniform, thereby reducing the diameter of the light spot 134 (FIG. 1). Consequently, a recording density of information to be recorded to the optical disc 101 can be increased. Further, information recorded on the optical disc 101 at a high recording density can be reproduced.

In this manner, the thin film layer 110 functions as reduction means for reducing the reflectance for light which enters the surface A of the transparent substrate 109 at the maximum possible angle α and is reflected by the surface A.

The thickness of the thin film layer 110 is set so as to satisfy any one of the following conditions 2–4, in addition to the above-mentioned condition 1.

Condition 2: the thickness of the thin film layer 110 is set so as to satisfy the condition that provision of the thin film layer 110 minimizes a substantial reflectance for light which enters the surface A of the transparent substrate 109 at an incident angle in the range of 0° to the maximum possible incident angle α. Here, the substantial reflectance corresponds to a value obtained by dividing an integral value by the range of an incident angle (α–0), where the integral value is obtained by integrating a reflectance for light, which enters at an incident angle in the range of 0° to the maximum possible incident angle α, over the incident angle. The actual reflectance refers to the ratio of the entire power between the light beam 133 shown in FIG. 1 and portions of the light beam 133, which are reflected by the surface A of the transparent substrate 109. Therefore, minimization of the substantial reflectance means maximization of power of portions of the light beam 133 transmitted through the transparent substrate 109. This realizes the optimal efficiency of light entering the surface A of the transparent substrate 109.

Condition 3: the thickness of the thin film layer 110 is set so as to satisfy the condition that a reflectance for light entering the surface A of the transparent substrate 109 at an incident angle of 0° (the light 130 shown in FIG. 1) is substantially equal to that for light entering the surface A of the transparent substrate 109 at the maximum possible incident angle α (the light 131 or 132 shown in FIG. 1). This means that when the maximum possible incident angle conforming to the standard for the optical disc 101 is, for example, α=58.2° (NA=0.85), reflectances indicated at point $Q_2$ (FIG. 2) and point $Q_3$ are substantially equal to each other. Note that the expression "reflectances are substantially equal to each other" means that a difference between the reflectances is substantially in a normal range of design. When this condition is satisfied, the light entering the surface A of the transparent medium 109 at the maximum possible incident angle is used as efficiently as that entering the surface A of the transparent medium 109 at the incident angle of 0°.

Condition 4: the thickness of the thin film layer 110 is set so as to satisfy the condition that provision of the thin film layer 110 minimizes a reflectance for light entering the surface A of the transparent substrate 109 at the maximum possible incident angle α (the light 131 or 132 shown in FIG. 1). When this condition is satisfied, the light entering the surface A of the transparent medium 109 at the maximum possible incident angle is efficiently used.

The thickness of the thin film layer 110 satisfying the above-mentioned condition 1 and any one of the conditions 2–4 can be determined by calculation or experimentation. For example, the above-described conditions 1 and 4 are satisfied when thickness t of the thin film layer 110 is set so as to substantially satisfy $t=\lambda/(4 \cdot n \cdot \cos \beta)$, where n is an index of refraction of the thin film layer 110 and β is an angle satisfying $\sin \alpha / \sin \beta = n$.

Figure 3:
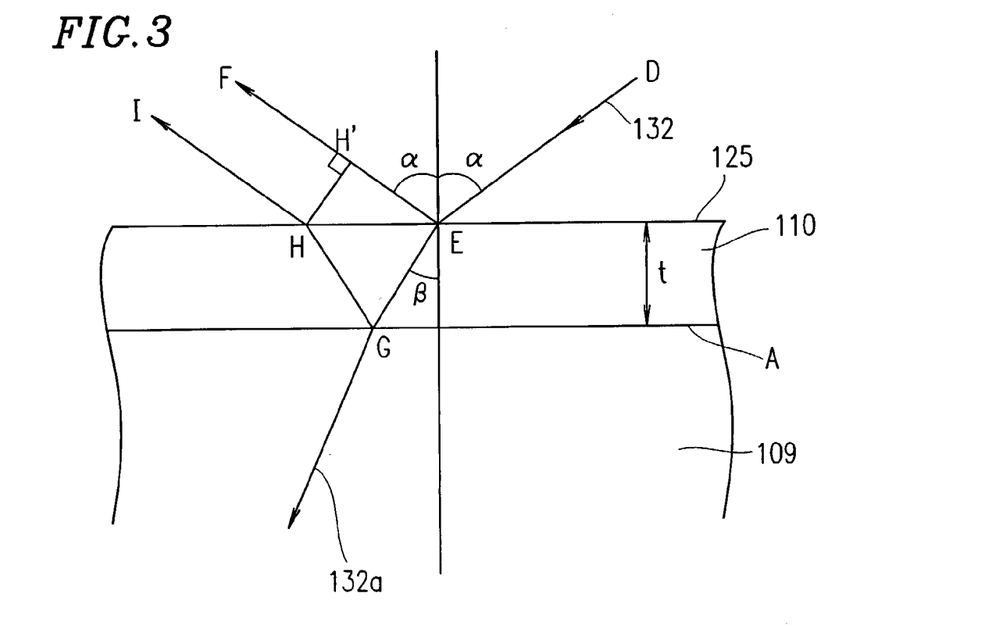
FIG. 3 is a diagram for explaining the principle that when thickness t of a thin film layer 110 is set so as to substantially satisfy $t=\lambda/(4 \cdot n \cdot \cos \beta)$, a reflectance for light, which enters the surface A of the transparent substrate 109 at the maximum possible incident angle α and is reflected by the surface A, is minimized.

FIG. 3 is a diagram for explaining the principle that when thickness t of the thin film layer 110 is set so as to substantially satisfy $t=\lambda/(4 \cdot n \cdot \cos \beta)$, the reflectance for light, which enters the surface A of the transparent substrate 109 at the maximum possible incident angle α and is reflected by the surface A, is minimized. In FIG. 3, for the purpose of detailedly describing how incident light 132 is reflected, the surface 125 of the thin film layer 110 is shown so as to be separate from the surface A of the transparent substrate 109.

The incident light 132 enters the thin film layer 110 at point E and is partially reflected by the surface 125 of the thin film layer 110 (path D→E→F). Also, the incident light 132 is partially transmitted through the thin film layer 110 and the transmitted portions are partially reflected by the surface A of the transparent substrate 109, transmitted, again, through the thin film layer 110, and exits the surface 125 (path D→E→G→H→I).

In order to minimize a reflectance (when the surface 125 of the thin film layer 110 and the surface A of the transparent substrate 109 are not distinguished from each other and is considered as being the same single surface, the reflectance is defined as the ratio of power between light reflected by the same single surface and light entering the same single surface), a phase difference corresponding to a ½ wavelength is required to be caused between light traveling along the path D→E→F and light traveling along the path D→E→G→H→I. In this case, the end of a perpendicular line extending from point H to line E–F is point H'. Further, the thickness of the thin film layer 110 is t and the index of refraction thereof is n.

In order for the phase difference, which corresponds to the ½ wavelength, to be caused between the light traveling along the path D→E→F and the light traveling along the path D→E→G→H→I, the following expression (2) is required to be satisfied.

$$n \cdot 2 \cdot (\text{distance } EG) - (\text{distance } H'E) = \lambda/2 \quad (2)$$

From FIG. 3,
(distance EG)=t/cos β,
sin α/sin β=n, and
(distance H'E)=2·(distance EG)·sin β·sin α.

Accordingly, from expression (2), the following expression (3) is satisfied.

$$2 \cdot n \cdot t \cdot \cos \beta = \lambda/2 \quad (3)$$

By transforming expression (3), $t=\lambda/(4 \cdot n \cdot \cos \beta)$ is obtained.

In the case where condition 4 is satisfied, when an index of refraction of the substrate is $n_0$ and $n=\sqrt{n_0}$ is further satisfied, a reflectance for light entering at the maximum possible angle is substantially zero. Practically, there are few materials satisfying $n=\sqrt{n_0}$. However, if $n<n_0$ (i.e., the index of refraction of the thin film layer 110 is smaller than that of the transparent substrate 109) and $t=\lambda/(4 \cdot n \cdot \cos \beta)$, the reflectance for light entering at the maximum possible incident angle is always reduced by providing the thin film layer 110.

A reduction of a reflectance is preferred not only in that the size of a light spot can be reduced but also in that stray light caused by reflection can be reduced. A reduction of the stray light caused by reflection is especially preferred when a reproduced signal is weak. The reduction of a reflectance is also preferred in that light emitted by a radiation source of an information recording/reproducing apparatus (which will be described later with reference to FIG. 5) using the optical disc 101 can be efficiently used.

It is preferred that the hardness of the thin film layer 110 is greater (harder) than that of the transparent substrate 109. In such a case, the thin film layer 110 also functions as a protective coating.

In order to make the hardness of the thin film layer 110 greater than that of the transparent substrate 109, for example, acrylic resin (pencil hardness 2H to 3H) is used for the thin film layer 110 and polycarbonate resin (pencil hardness B to HB) is used for the transparent substrate 109. A representative index of refraction of acrylic resin is 1.48 to 1.50 and a representative index of refraction of polycarbonate resin is 1.55 to 1.58. Accordingly, in such a case, the aforementioned relationship $n < n_0$ is also satisfied.

In an objective lens having a high numerical aperture NA, a distance between the lens and an optical disc (working distance WD) is short. In the case of using such an objective lens, when a surface of the optical disc is greatly oscillated or malfunctioning is caused during retraction of a focus servo, the objective lens may collide with the optical disc. When the thin film layer 110 made of acrylic resin functions as a protective coating, the thin film layer 110 prevents the polycarbonate resin from being damaged by such collision. The surface of the thin film layer 110 made of acrylic resin is smooth and substantially frictionless, and thus it is preferred that the thin film layer 110 is used for coating. Vapor deposition may be performed on the surface of the thin film layer 110 for preventing the surface from being scratched.

The thin film layer 110 may have a multilayered structure. When the thin film layer 110 has a multilayered structure, the designed width of the thin film layer 110 is increased for satisfying the above-described conditions 1–4, and thus a reflectance for the S-polarized light can be substantially zero. However, in view of the cost for producing optical disks it is practically sufficient for the thin film layer 110 to have a single-layer structure.

EXAMPLE 2

In Example 1, the thin film layer 110 functions as a reflectance reduction means for reducing a reflectance for light which enters the surface A of the transparent substrate 109 at the maximum possible incident angle α and is reflected by the surface A, while, in Example 2, another example of the reflectance reduction means is described.

Figure 4A:
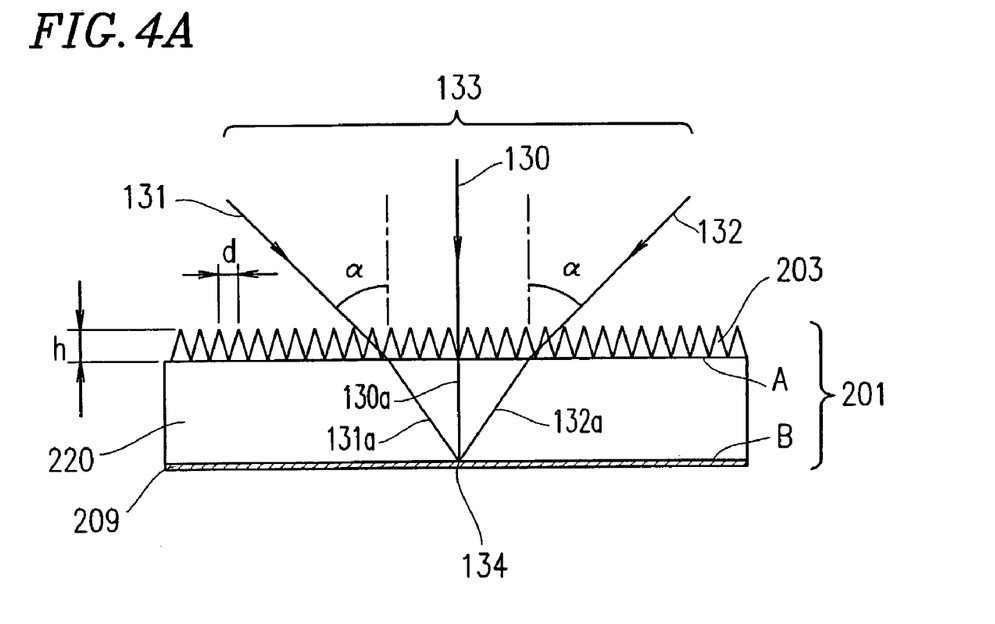
FIG. 4A is a cross-sectional view of an optical disk 201 according to Example 2 of the present invention.

FIG. 4A is a cross-sectional view of an optical disc 201 (an information recording medium) according to Example 2 of the present invention. The optical disc 201 includes: a transparent substrate 209 having a surface A (a first surface) and a surface B (a second surface) opposite to the surface A; a plurality of structures 203 provided on the surface A of the transparent substrate 209; and an information recording layer 220 provided on the surface B of the transparent substrate 209. All of these elements may be held on a base (not shown).

FIG. 4A shows that light (lights 130, 131, and 132) enters the surface A of the transparent substrate 209 at an angle in the range of 0° to α (the maximum possible incident angle). Portions of the lights 130, 131, and 132 transmitted through the transparent substrate 109 (corresponding to lights 130a, 131a, and 132a, respectively) are converged on the information recording layer 120. The transmitted light (the lights 130a, 131a, and 132a) is used for recording/reproducing information to/from the information recording layer 120.

The optical disc 201 (an information recording medium) may be a reproduction-only recording medium or a recordable and reproducible recording medium.

Note that the maximum possible incident angle α is a constant conforming to a prescribed standard for the optical disc 201. The maximum possible incident angle α may be, for example, 50° or more to 72° or less. The lights 130, 131, and 132 correspond to light emitted from the same radiation source and have a prescribed wavelength λ defined by the standard to which the optical disc 201 conforms.

The transparent substrate 209 is formed of glass or a resin material.

The plurality of structures 203 are arranged on the surface A of the transparent substrate 209 in a two-dimensional manner. Each structure 203 is substantially conical or pyramidal (e.g., quadrangular-pyramidal).

The information recording layer 220 may have any configuration capable of retaining information.

Dimension d of a structure 203 along the surface A is preferably λ/4 or more to 2λ or less, and height h from the surface A is preferably λ/2 or more to 3λ or less. Here, λ is a wavelength of the light beam 133 (i.e., wavelengths of the light 130, 131, and 132). The structure 203 is referred to as the "subwavelength structure". The plurality of structures 203 function as reduction means for reducing a reflectance for light which enters the surface A of the transparent substrate 209 at the maximum possible incident angle α and is reflected by the surface A.

Figure 4B:
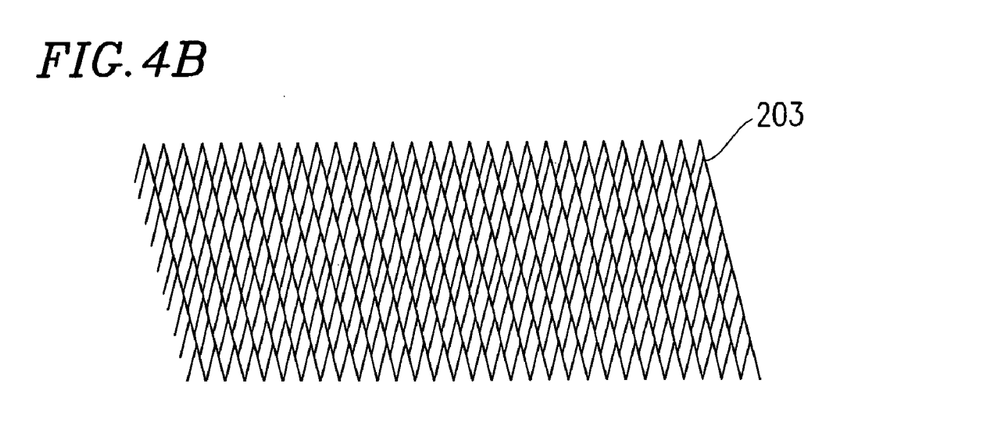
FIG. 4B is a perspective view schematically illustrating the surface structure of the optical disc 101.

FIG. 4B is a perspective view schematically illustrating the surface structure of the optical disc 101.

Publication 1 shown below describes a reduction of a reflectance due to the subwavelength structure (Publication 1: Y. Ono, et al., "Antireflection effect in ultrahigh spatial-frequency holographic relief gratings", Appl. Opt. Vol. 26, pp. 1142–1146, 1987). Publication 1 describes an example of using an etching method or the like to form structures arranged on a surface of a glass substrate in a one-dimensional cycle. In the example of Publication 1, light having a wavelength of 633 nm is used, and an in-plane cycle of a plane on which the structures are arranged is shorter than the wavelength and the depth of the plane is greater than the wavelength. Publication 1 reports a calculation result that the structures realize a reflectance of 0.03 or less at an incident angle in the range of 0° to 60°.

There is another publication related to the subwavelength structure (Publication 2: E. B. Grann, et al., "Optimal design for antireflective tapered two-dimensional subwavelength grating structures", J. Opt. Soc. Am. A Vol. 12, pp. 333–339, 1995), which describes pyramidal subwavelength structures. Such subwavelength structures reduce dependence of a reflectance on polarized light. In the example of Publication 2, light having a wavelength of 4.7 μm is used, and Publication 2 reports a calculation result that a reflectance of 0.01 or less (an average reflectance for the P- and S-polarized lights) is obtained at an angle in the range of 0° to 57°. Publications 1 and 2 also describe that dependence of such subwavelength structures on a wavelength is small.

Publication 3 (Takahara, Toyota, Okano, Yotsuya, and Kikuta, "Optical characteristics of antireflective structures produced by reactive ion etching", Proceeding 31a-W-11 of the 47th scientific lecture meeting of the Japanese Society of Applied Physics, 2000) reports that conical subwavelength structures have an effect of satisfactorily reducing a reflectance.

By providing the plurality of structures 203 (subwavelength structures) on the surface A of the transparent substrate 209, it is possible to reduce a reflectance for light reflected by the surface A of the transparent substrate 209. Further, since dependence of a reflectance on polarized light can be reduced (a difference between reflectances for the P- and S-polarized lights can be reduced), light entering the surface A of the transparent substrate 209 at a large angle (e.g., at the maximum possible incident angle α or an angle in the vicinity thereof) is transmitted through the transparent substrate 209 at high transmittance regardless of the polarized direction thereof, and is led to the information recording layer 220. Accordingly, the provision of the plurality of structures 203 intensifies light around the periphery of the entrance pupil. Consequently, light distribution at the entrance pupil becomes uniform and the diameter of the light spot 134 (FIG. 4A) is reduced. Therefore, a recording density of information to be recorded to the optical disc 201 can be increased. Further, information recorded on the optical disc 201 at a high recording density can be reproduced.

For example, when forming the transparent substrate 201 (FIG. 4A), the plurality of structures 203 may be formed by transcription using a forming die in which a mold of the plurality of structures 203 are previously formed by an etching method or the like. According to this method, the number of steps is not increased as compared to a conventional method for producing optical discs.

Alternatively, the plurality of structures 203 may be previously formed on a film made of a resin material or the like by transcription using a forming die, and the film may be laminated on the transparent substrate 209.

The plurality of structures 203 (subwavelength structures) have a property that dependence of a reflectance on a wavelength is small (i.e., an effect of similarly reducing a reflectance for light having different wavelengths is achieved), and thus the optical disc 201 according to Example 2 of the present invention can be preferably used for recording/reproducing information thereto/therefrom using light having a plurality of wavelengths.

EXAMPLE 3

Example 3 is described with reference to an information recording/reproducing apparatus including the optical disc 101 (FIG. 1) or optical disc 201 (FIG. 4A) described above in Example 1.

Figure 5:
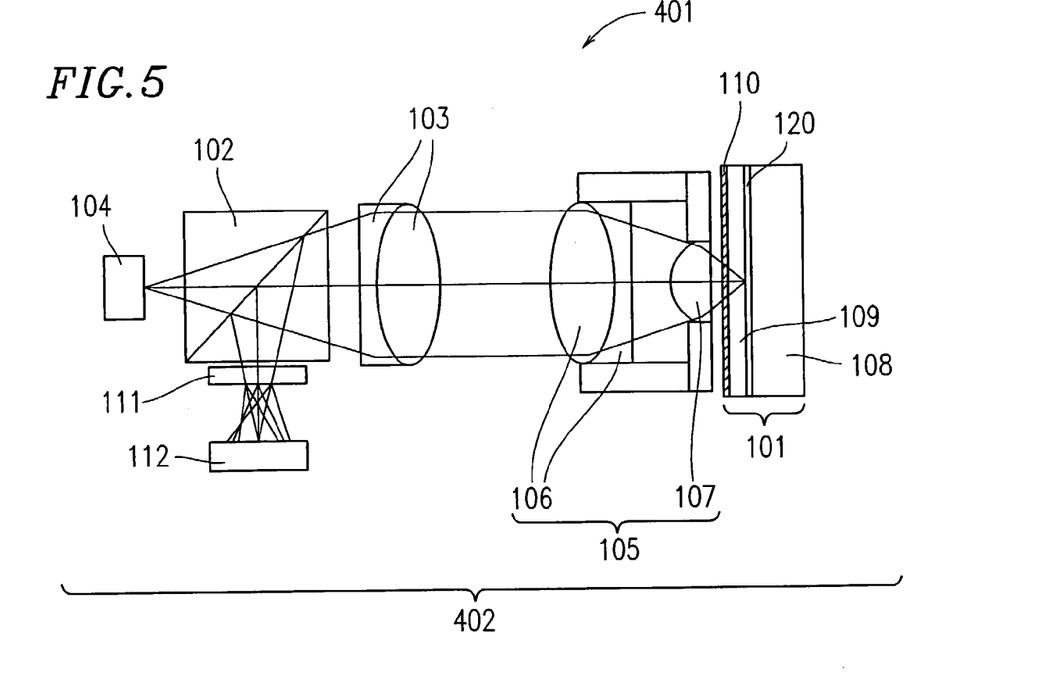
FIG. 5 is a diagram illustrating a configuration of an information recording/reproducing apparatus 401 according to Example 3 of the present invention.

FIG. 5 illustrates a configuration of an information recording/reproducing apparatus 401 according to Example 3 of the present invention. The information recording/reproducing apparatus 401 includes an optical disc 101 and an optical head 402. The information recording/reproducing apparatus 401 records information to the optical disc 101 or reproduces information recorded on the optical disc 101. The optical disc 101 is the same as that described above in conjunction with Example 1 of the present invention and with reference to FIG. 1.

The optical head 402 includes a radiation source 104, a beam splitter 102, a collimating lens 103, a combined objective lens 105, a hologram 111, and a photodetector 112. The combined objective lens 105 includes a cemented lens 106 and a front objective lens 107.

The radiation source 104 is a laser for emitting a violet laser beam. The central wavelength of the laser beam is 407±20 nm. The collimating lens 103 is designed such that defocusing is not caused by a wavelength variation within the band.

In order for the entire optical system including the beam splitter 102 and the collimating lens 103 to correct chromatic aberration, the collimating lens 103 includes two laminated lenses.

The photodetector 112 performs a focus servo detection using a detection method referred to as the "spot size detection (SSD)". According to this method, when a wavelength of a laser beam emitted by the radiation source 104 varies, a light spot formed in the photodetector 112 by a ±1-order light beam diffracted by the hologram 111 symmetrically moves with respect to a focal point. Accordingly, even when a diffraction angle of the ±1-order light beam at the hologram 111 is changed due to a wavelength variation, no errors are caused to a detected servo signal. A method which does not cause an error due to a wavelength variation is employed for detecting a tracking error signal by the photodetector 112.

Figure 6:
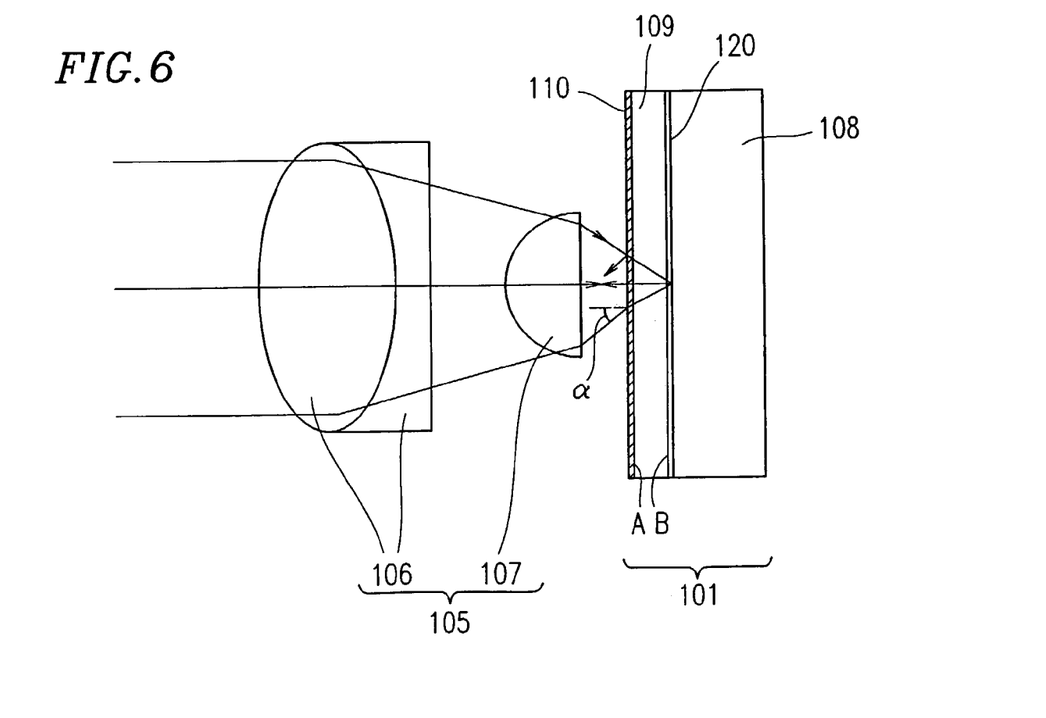
FIG. 6 is an enlarged view illustrating a combined objective lens 105 and the optical disc 101.

FIG. 6 is an enlarged view illustrating the combined objective lens 105 and the optical disc 101.

The combined objective lens 105 is set so as to have a numerical aperture NA between 0.80 and 0.92. An objective lens having such a high numerical aperture cannot be configured by a single aspheric lens. Further, in order to correct chromatic aberration, the objective lens is required to be configured by using a plurality of lenses made of vitreous materials having different dispersion characteristics. Therefore, the combined objective lens 105 consists of two groups including three lenses, i.e., the lens 106 including two laminated lenses and the front objective lens 107. This lens configuration is necessary for maintaining a high numerical aperture, while correcting chromatic aberration.

During recording/reproducing of information to/from the optical disc 101, the combined objective lens 105 follows the three-dimensional movement of the optical disc 101 so as to keep a constant distance (working distance WD) to the optical disc 101. Accordingly, it is preferred that the objective lens 105 and the optical disc 108 are entirely corrected for chromatic aberration due to color dispersion. Specifically, it is preferred that chromatic aberration of the objective lens, which is caused due to the lens power and color dispersion, chromatic aberration of the thin film layer 110, which is caused due to color dispersion, and chromatic aberration of the transparent substrate 109, which is caused due to color dispersion, are entirely cancelled. Note that the information recording/reproducing apparatus 402 according to Example 3 of the present invention is set such that WD=0.15 mm.

Referring again to FIG. 5, the operation of the information recording/reproducing apparatus 401 will be described.

When recording information to the optical disc 101, the radiation source 104 emits a laser beam modulated according to that information. The light beam is transmitted through the beam splitter 102 and is rendered into parallel light by the collimating lens 103. The parallel light is transmitted through the combined objective lens 105 and enters the surface A of the transparent substrate 109 of the optical disc 101 at an incident angle in the range of 0° to the maximum possible incident angle α (the maximum possible incident angle α is shown in FIG. 6). The light having entered the surface A is transmitted through the transparent substrate 109 and converged on the information recording layer 120.

When reproducing information recorded on the optical disc 101, the radiation source 104 emits a nonmodified light beam. The light beam emitted by the radiation source 104 is transmitted through the beam splitter 102 and is rendered into parallel light by the collimating lens 103. The collimated light is transmitted through the combined objective lens 105 and enters the surface A of the transparent substrate 109 of the optical disc 101 at an incident angle in the range of 0° to the maximum possible incident angle α (the maximum possible incident angle α is shown in FIG. 6). The light having entered the surface A is transmitted through the transparent substrate 109 and converged on the information recording layer 120.

The light beam is reflected by the information recording layer 120 and is transmitted, again, through the transparent substrate 109, the combined objective lens 105, and the collimating lens 103. The transmitted light is reflected by the beam splitter 102 and enters the photodetector 112. In the photodetector 112, an information signal representing information recorded on the optical disc 101 and a servo signal for tracking are retrieved.

In this manner, the collimating lens 103 and the combined objective lens 105 function together as light converging means for allowing the light beam (light) emitted by the radiation source 104 to enter the surface A of the optical disc 101 at an angle in the range of 0° to the maximum possible incident angle α. The maximum possible incident angle α is set so as to be, for example, 50° or more to 72° or less.

The information recording/reproducing apparatus 401 may be configured to perform either recording of information to the optical disc 101 or reproducing of information recorded on the optical disc 101 or may be configured to perform both. When the information recording/reproducing apparatus 401 performs only recording of information to the optical disc 101, the beam splitter 102, the hologram 111, and the photodetector 112 can be omitted.

The information recording/reproducing apparatus 401 according to Example 3 of the present invention uses the optical disc 101 according to Example 1 of the present invention, and therefore the combined objective lens 105 having a high numerical aperture can efficiently give the full performance for recording information to the optical disc 101 at a high density and/or reproducing information recorded on the optical disc 101 at a high density.

As described above, the optical disc 101 according to Example 1 of the present invention can be used for Example 3 of the present invention. However, the optical disc 201 according to Example 2 can also be used instead of using the optical disc 101.

INDUSTRIAL APPLICABILITY

As described above, according to the present invention, reflectance reduction means is provided on a first surface of a transparent substrate of an information recording medium. The reflectance reduction means reduces a reflectance for light which enters the first surface at the maximum possible incident angle and is reflected by the first surface. This reduces the size of a light spot formed on an information recording layer of the information recording medium. As a result, a recording density of information to be recorded on the information recording medium can be increased. Further, information recorded on the information recording medium at a high density can be reproduced.

The invention claimed is:

1. An information recording medium comprising:
a transparent substrate having a first surface and a second surface opposite to the first surface;
reflectance reduction means provided on the first surface of the transparent substrate; and
an information recording layer provided on the second surface of the transparent substrate,
wherein portions of light having entered the first surface at an incident angle in the range of 0° to a maximum possible incident angle, which are transmitted through the transparent substrate, are used for recording information to the information recording layer or reproducing information recorded on the information recording layer,
the reflectance reduction means reduces a reflectance for the light which enters the first surface at the maximum possible incident angle and is reflected by the first surface,
the reflectance reduction means includes a transparent thin film layer,
the thickness of the thin film layer is set so as to minimize the reflectance for light, which enters the first surface of the transparent substrate at the maximum possible incident angle and is reflected by the first surface of the transparent substrate, and
the index of refraction of the thin film layer is smaller than that of the transparent substrate.

2. An information recording medium according to claim 1, wherein the light entering at the maximum possible incident angle has a prescribed wavelength λ and the thickness of the thin film layer is set so as to substantially satisfy $t=\lambda/(4 \cdot n \cdot \cos \beta)$, where n is an index of refraction of the thin film layer and β is an angle satisfying $\sin \alpha/\sin \beta = n$ when the maximum possible incident angle is α.

3. An information recording medium according to claim 1, wherein a hardness of the thin film layer is greater than that of the transparent substrate.

4. An information recording medium according to claim 1, wherein the maximum possible incident angle is 50° or more to 72° or less.

5. An information recording/reproducing apparatus comprising:
an information recording medium of claim 1;
a radiation source for emitting light; and
light converging means for allowing the light emitted by the radiation source to enter the first surface of the information recording medium at an incident angle in the range of 0° to a maximum possible incident angle.

6. An information recording medium, comprising:
a transparent substrate having a first surface and a second surface opposite to the first surface;
reflectance reduction means provided on the first surface of the transparent substrate; and
an information recording layer provided on the second surface of the transparent substrate,
wherein portions of light having entered the first surface at an incident angle in the range of 0° to a maximum possible incident angle, which are transmitted through the transparent substrate, are used for recording information to the information recording layer or reproducing information recorded on the information recording layer,
the reflectance reduction means reduces a reflectance for the light which enters the first surface at the maximum possible incident angle and is reflected by the first surface, and
the light entering at the maximum possible incident angle has a prescribed wavelength λ and the reflectance reduction means includes a plurality of structures arranged on the second surface in a two-dimensional manner, each of the plurality of structures being substantially conical or pyramidal and having a dimension of λ/4 or more to 2λ or less along the first surface and a height of λ/2 or more to 3λ or less from the first surface.

7. An information recording medium according to claim 6, wherein the plurality of structures are formed by transcription using a forming die.

8. An information recording medium according to claim 6, wherein the plurality of structures are formed on a film formed of a resin material laminated on the first surface of the transparent substrate.

9. An information recording/reproducing apparatus according to claim 5, wherein the maximum possible incident angle is 50° or more to 72° or less.

* * * * *